United States Patent [19]

Nishio

[11] Patent Number: 5,208,691
[45] Date of Patent: May 4, 1993

[54] WAVELENGTH-TIME-SPACE DIVISION SWITCHING SYSTEM

[75] Inventor: Makoto Nishio, Tokyo, Japan
[73] Assignee: NEC Corporation, Tokyo, Japan
[21] Appl. No.: 723,157
[22] Filed: Jun. 28, 1991

[30] Foreign Application Priority Data

Jun. 29, 1990 [JP] Japan .................. 2-172921

[51] Int. Cl.[5] .............................................. H04J 14/00
[52] U.S. Cl. .................................. 359/123; 359/117; 359/135; 385/16
[58] Field of Search .............. 359/117, 123, 124, 128, 359/135, 139; 385/16; 370/50

[56] References Cited

U.S. PATENT DOCUMENTS

| | | | |
|---|---|---|---|
| 5,005,166 | 4/1991 | Suzuki et al. | 359/123 |
| 5,018,130 | 5/1991 | Suzuki et al. | 359/124 |

FOREIGN PATENT DOCUMENTS

| | | | |
|---|---|---|---|
| 0184997 | 8/1986 | Japan | 359/123 |
| 0050194 | 3/1988 | Japan | 359/123 |
| 0209397 | 8/1988 | Japan | 359/123 |

*Primary Examiner*—Edward L. Coles, Sr.
*Assistant Examiner*—Knife-Michael Negash
*Attorney, Agent, or Firm*—Sughrue, Mion, Zinn, Macpeak & Seas

[57] ABSTRACT

An optical switching network comprises a plurality of optical splitters coupled respectively to inlet highways for receiving wavelength-time division multiplex (WTDM) signals through the respective inlet highways, each of the multiplex signals comprising a series of WTDM signals each being identified by a unique wavelength and a unique time slot. A like plurality of sets of tunable wavelength filters are provided. The filters of each set are coupled to respective outputs of the splitters for selecting one of the WTDM signals. A like plurality of time-space switches are associated respectively with the sets of the tunable wavelength filters. Each of the time-space switches has input ports and output ports, the input ports of the time-space switch being coupled respectively to outputs of the filters of the associated set for interchanging the time slot of the selected WTDM signal with another time slot and establishing a path for the selected wavelength between the input ports and the output ports. A like plurality of sets of wavelength tunable lasers are provided, the wavelength tunable lasers of each set being coupled to the output ports of an associated one of the time-space switches for generating an optical output according to the WTDM signal from the established path, the optical output having a wavelength different from the wavelength of the selected WTDM signal. A like plurality of optical combiners are provided for coupling the output of the wavelength tunable lasers of different sets to a respective one of outlet highways.

10 Claims, 4 Drawing Sheets

WAVELENGTH-TIME-SPACE DIVISION SWITCHING SYSTEM

RELATED APPLICATIONS

This application is related to the following Co-pending United States Patent Applications:
1) Ser. No. 07/251,486, filed Sep. 30, 1988 now U.S. Pat. No. 5,005,166;
2) Ser. No. 07/370,192, filed Jun. 22, 1989 now U.S. Pat. No. 5,018,130;
3) Ser. No. 07/616,046, filed Nov. 20, 1990, all the Copending applications being assigned to the same assignee as the present invention.

BACKGROUND OF THE INVENTION

The present invention relates generally to switching systems, and more specifically to a wavelength-time division switching system.

A time and wavelength division switching system as disclosed in the aforesaid U.S. application Ser. No. 07/251,486 comprises a splitter for splitting an inlet highway into a plurality of paths which lead to multiple wavelength selectors respectively, multiple optical time switches coupled respectively to the outputs of the wavelength selectors and multiple wavelength converters coupled respectively to the outputs of the time switches. A wavelength-time division multiplex (WTDM) signal is supplied through the inlet highway to the wavelength selectors. Control signals are applied to the wavelength selectors, time switches and wavelength converters to select a wavelength of the WTDM signal on each divided path and interchange time slots of the selected wavelength and finally converts the selected wavelength to a desired wavelength. The optical outputs of the wavelength converters are combined together by a combiner for coupling to an outlet highway.

Since the prior art switching network is only capable of switching optical signals in the wavelength and time domains, it is desired to increase the number of channels that can be switched.

SUMMARY OF THE INVENTION

It is therefore an object of the present invention to provide a high-capacity optical switching network.

According to the present invention, there is provided an optical switching network comprising a plurality of optical splitters coupled respectively to inlet highways for receiving wavelength-time division multiplex (WTDM) signals through the respective inlet highways, each of the multiplex signals comprising a series of WTDM signals each being identified by a unique wavelength and a unique time slot. A like plurality of sets of tunable wavelength filters are provided. The filters of each set are coupled to respective outputs of the splitters for selecting one of the WTDM signals. A like plurality of time-space switches are associated respectively with the sets of the tunable wavelength filters. Each of the time-space switches has input ports and output ports, the input ports of the time-space switch being coupled respectively to outputs of the filters of the associated set for interchanging the time slot of the selected WTDM signal with another time slot and establishing a path for the selected WTDM signal between the input ports and the output ports. A like plurality of sets of wavelength conversion means are provided, the wavelength conversion means of each set being coupled to the output ports of an associated one of the time-place switches for generating an optical output according to the WTDM signal from the established path, the optical output having a wavelength different from the wavelength of the selected WTDM signal. A like plurality of optical combiners are provided for coupling the output of the wavelength conversion means of different sets to a respective one of outlet highways.

In a preferred embodiment the network further includes a plurality of pre-stages and/or a plurality of post-stages. Each pre-stages comprises a plurality of second optical splitters coupled respectively to the first optical splitters, and a plurality of optical switches each having a plurality of input ports coupled respectively to the second optical splitters and an output port coupled to an associated one of the tunable wavelength filters, each of the optical switches selectively coupling an output of the second optical splitters to the associated tunable wavelength filter. Each post-stages comprises a plurality of optical switches each having an input port coupled to an associated one of the wavelength switches and a plurality of output ports. Each of the second optical switches couples the output of the associated wavelength switch to one of its output ports, and a plurality of second optical combiners each having a plurality of input ports coupled respectively to the output ports of the second optical switches and an output port coupled to an associated one of the first optical combiners.

BRIEF DESCRIPTION OF THE DRAWINGS

The present invention will be described in further detail with reference to the accompanying drawings, in which.

DETAILED DESCRIPTION

Figure 1:
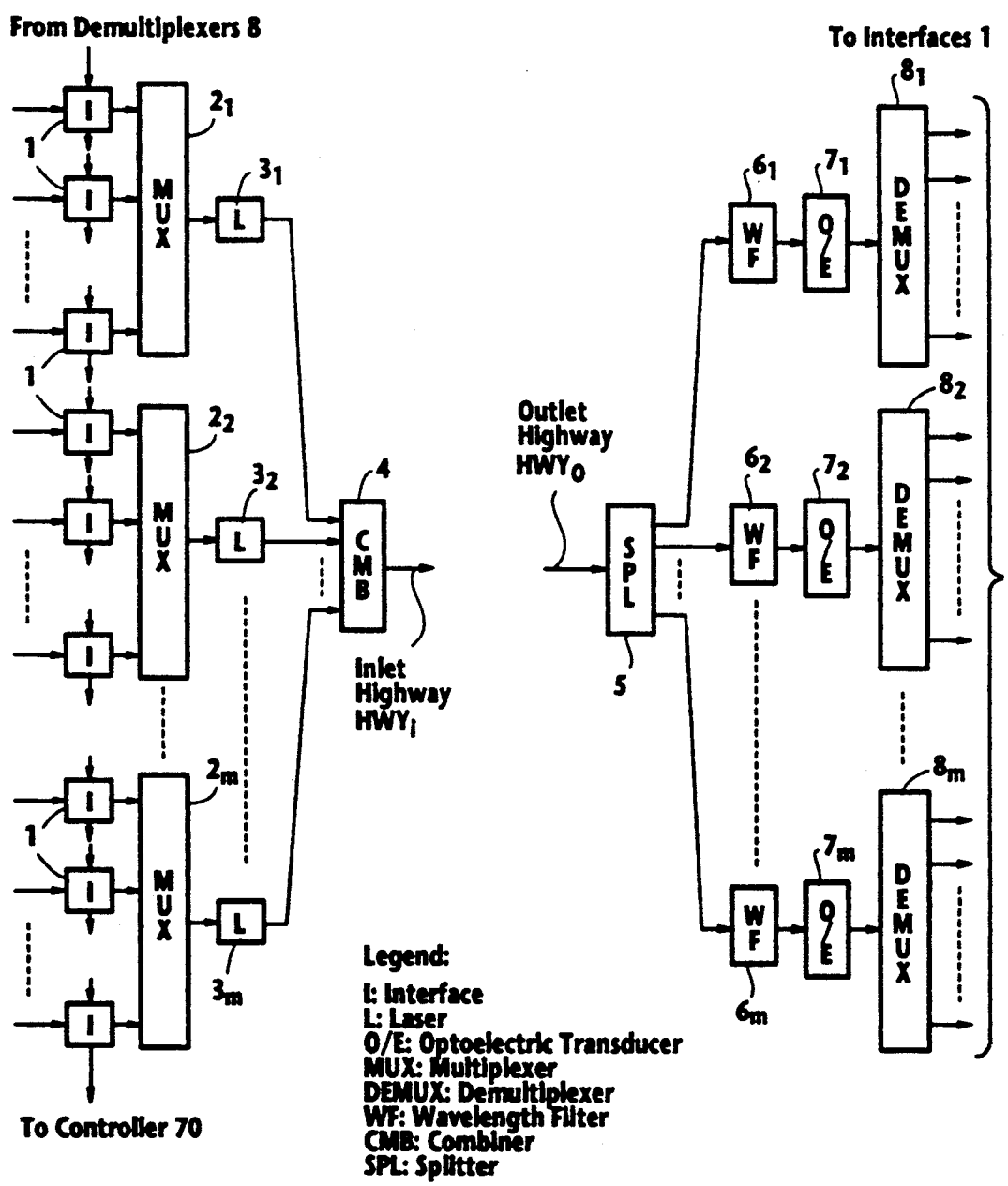
FIG. 1 is a block diagram of the multiplexer and demultiplexer of a wavelength-time division switching system according to a first embodiment of the present invention.

Referring now to FIG. 1, the wavelength-time-space (WTS) division switching system of this invention is made up of a wavelength-time division multiplexer and a wavelength-time division demultiplexer. The multiplexer comprises a plurality of line interfaces 1 to which electrical signals from line and trunks are converted to digital signals. Interfaces 1 are divided into "m" groups corresponding respectively to time-division multiplexers $2_1$ through $2_m$. The digital signals from each group are multiplexed by the associated multiplexer and supplied to a laser $3_i$ ($i = 1, 2, \ldots$ m) for emitting light of a particular wavelength unique to the groups of TDM (time-division multiplex) signals. The outputs of lasers 3 are multiplexed into a WTDM (wavelength-time division multiplex) signal by an optical combiner 4 and applied to a waveguide or inlet highway $HWY_i$. Each interface extracts a call processing signal from signals received from the line and supplies it to a network controller.

The demultiplexer is made up of an optical splitter 5 for splitting a WTDM signal supplied on an outlet highway $HWY_o$ into several optical paths leading respectively to wavelength filters $6_1$ through $6_m$ having wavelength passbands corresponding respectively to the wavelengths light emitted by lasers $3_1$ through $3_m$. The outputs of wavelength filters $6_1 \sim 6_m$ are converted to electrical signals by optoelectric transducers $7_1 \sim 7_m$ respectively and applied to time division demultiplexers $8_1 \sim 8_m$ so that the WTDM signals of each group are decomposed into electrical signals. For full-duplex operation, the outputs of demultiplexers $8_1 \sim 8_m$ are coupled to the interfaces of the corresponding group.

According to the present invention, a plurality of such WTDM multiplexers are provided for connection to multiple inlet highways and a plurality of such WTDM demultiplexers are provided for connection to a plurality of such WTDM demultiplexers are provided for connection to multiple outlet highways.

Figure 2:
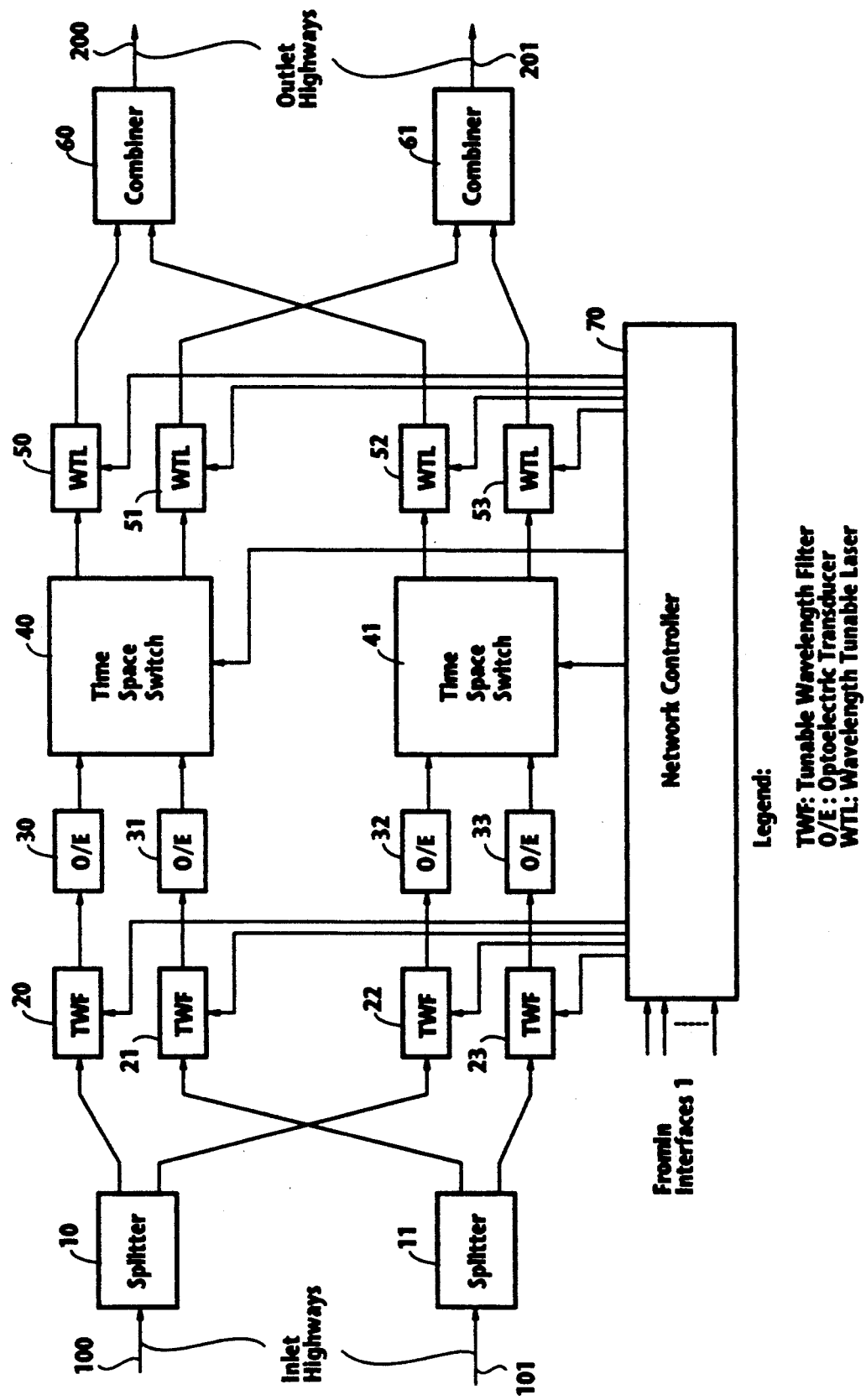
FIG. 2 is a block diagram of a wavelength-time-space switching network of the present invention.

For simplicity, only two inlet highways and two outlet highways are shown in FIG. 2, and incoming signals from the lines are multiplexed onto two time slots $T_1$ and $T_2$ and two wavelengths $\lambda_1$ and $\lambda_2$. The WTS switching system comprises a WTDM switching network connected between inlet highways 100, 101 and outlet highways 200, 201, and a network controller 70 to which call processing signals from incoming lines and trunks are supplied through interfaces 1.

Inlet highways 100 and 101 are connected to optical splitters 10 and 11, respectively. The optical information signal from a first WTDM multiplexer is coupled through inlet highway 100 and split by splitter 10 into optical waveguides, one leading to a tunable wavelength filter 20 and the other to a tunable wavelength filter 22. Likewise, the optical information signal of a second WTDM multiplexer is coupled through inlet highway 101 and split into two optical waveguides, one extending to a tunable wavelength filter 21 and the other to a tunable wavelength filter 23. Tunable wavelength filters $20 \sim 23$ are respectively controlled by a wavelength/time slot selection signal which is supplied from network controller 70 on the time slot of a desired signal to select one of the two wavelength components $\lambda_1$ and $\lambda_2$. Thus, tunable wavelength filters $20 \sim 23$ provide a time slot switching function as well as a wavelength switching function. The optical signals from the outputs of tunable wavelength filters $20 \sim 23$ are converted to corresponding electrical signals by optoelectric transducers $30 \sim 33$, respectively. The outputs of O/E transducers 30 and 31 are coupled to respective input ports of a time-space switch 40 and those of O/E transducers 32 and 33 are coupled to respective input ports of a time-space switch 41. Each of the time-space switches is responsive to a time/space switching signal supplied from the network controller 70 for switching the time slot of the input signals to a desired time slot on the output port of the switch that leads to a desired outlet highway. Each time-space switch is of memory matrix configuration as described in S. Hayano et al "A Time-Division Broadband Switching Network Using a Frame Synchronization Technique", IEEE Communications Society, IEEE International Conference on Communications, Jun. 12-15, 1988.

Wavelength tunable lasers 50 and 51 are coupled to respective output ports of time-space switch 40 and wavelength tunable lasers 52 and 53 are coupled to respective output ports of time-space switch 41. Each of these lasers responds to a wavelength selection signal supplied from network controller 70 by emitting a laser beam of wavelength $\lambda_1$ or $\lambda_2$ specified by the selection signal. The outputs of wavelength tunable lasers 50 and 51 are coupled by waveguides to first inputs of optical combiners 60 and 61, respectively, and those of wavelength tunable lasers 52 and 53 are coupled to second inputs of optical combiners 60 and 61, respectively. The outputs of combiners 60 and 61 are coupled to outlet highways 200 and 201, respectively.

Figure 3:
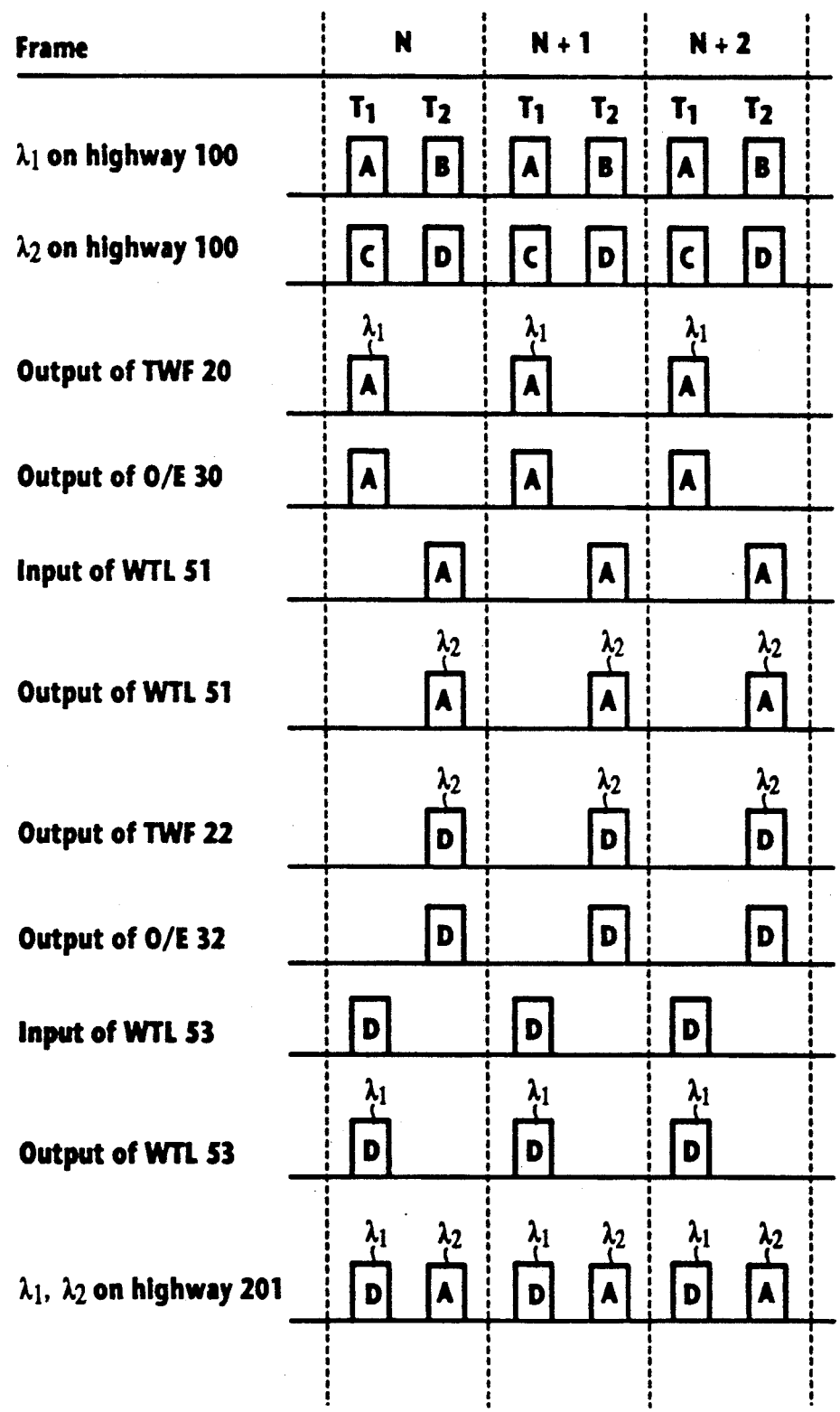
FIG. 3 is a timing diagram associated with the switching network of FIG. 2.

The operation of the system of FIG. 2 will be described with reference to FIG. 3.

On inlet highway 100, incoming WTDM signals A and B of wavelength $\lambda_1$ are multiplexed on time slots $T_1$ and $T_2$, and WTDM signals C and D of wavelength $\lambda_2$ are multiplexed on time slots $T_1$ and $T_2$. Assume that WTDM signals A of successive frames N, N+1, N+2 are to be switched to time slot $T_2$ and wavelength $\lambda_2$ on outlet highway 201, and successive WTDM signals D are to be switched to time slot $T_1$ and wavelength $\lambda_1$ on outlet highway 201. Network controller 70 controls wavelength filter 20 to select wavelength $\lambda_1$ and time slot $T_1$ so the light signals A appearing at the input of wavelength filter 20 are selected during successive frames N, N+1 and N+2 and converted to corresponding electrical signals by O/E transducer 30. Controller 70 then supplies a time/space switching signal to switch 40 to switch the $T_1$-time slot of WTDM signals A to $T_2$ while selecting a path to tunable laser 51. Controller 70 now supplies a wavelength selection signal to laser 51 to cause it to emit light of wavelength $\lambda_2$. Therefore, WTDM signals A of wavelength $\lambda_2$ appears on outlet highway 201 as a signal time-division multiplexed on time slot $T_2$. In a similar manner, network controller 70 controls wavelength filter 22 to select wavelength $\lambda_2$ and time slot $T_2$ so that WTDM signals D appearing at the input of wavelength filter 22 are selected during successive frames N, N+1 and N+2 and converted to corresponding electrical signals by O/E transducer 32. Controller 70 then supplies a time/space switching signal to switch 41 to switch the $T_2$-time slot of signals D to $T_1$ and select a path to tunable laser 53. Controller 70 now supplies a wavelength selection signal to laser 53 to cause it to emit light of wavelength $\lambda_1$. Therefore, signals D of wavelength $\lambda_1$ appears on outlet highway 201 as a signal which is multiplexed on time slot $T_1$.

If WTDM signals B are to be switched to outlet highway 200, it is seen that controller 70 will supply a $\lambda_1$ selection signal to wavelength filter 20 during time slot $T_2$, a $T_2$-to-$T_1$ switching signal to switch 40 for switching the signals to time slots $T_1$ on a path to tunable filter 50, and a $\lambda_1$ selection signal to the filter 50. In this way, all signals of each inlet highway is switched to any of the outlet highways.

Figure 4:
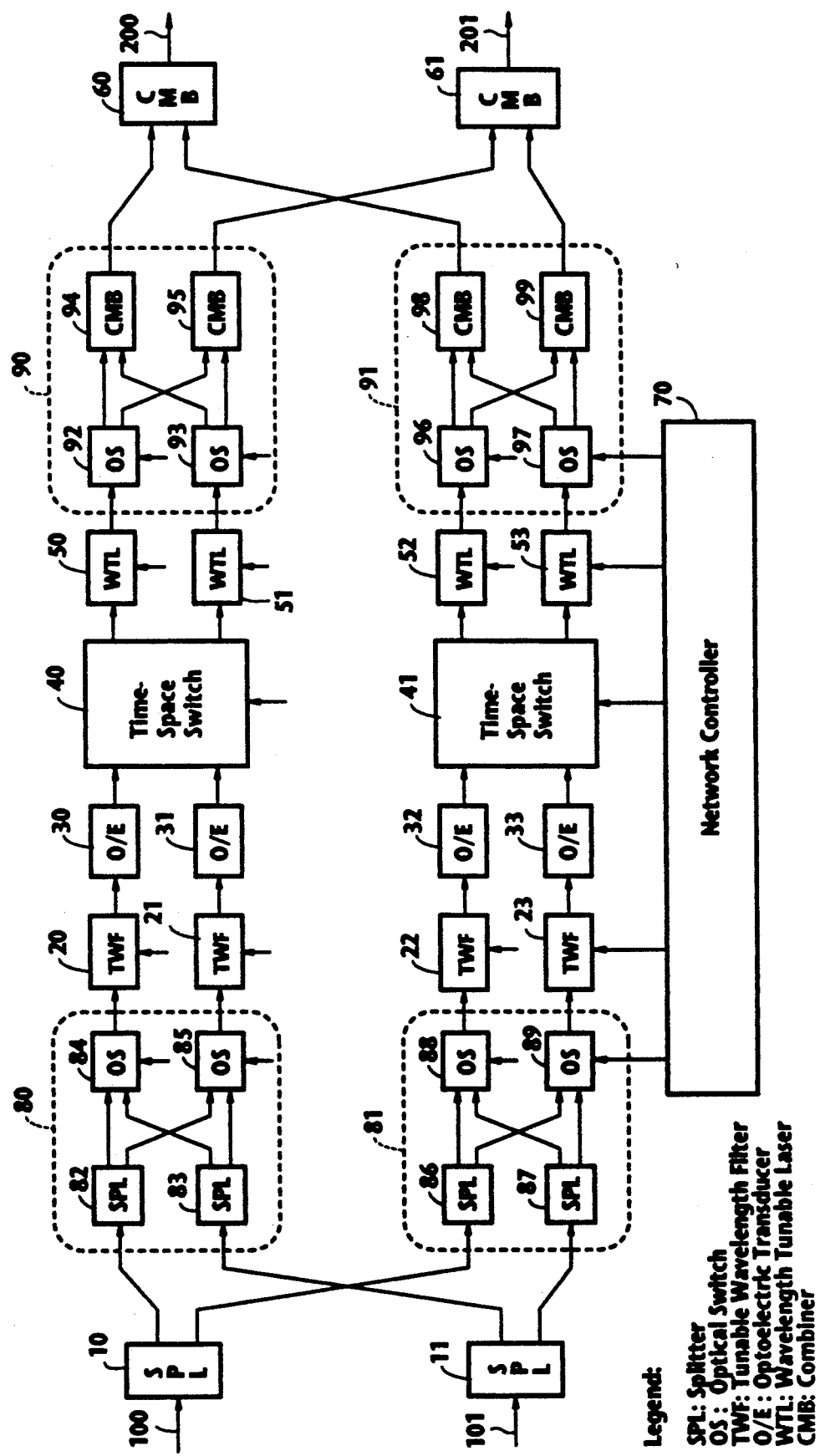
FIG. 4 is a block diagram of a modified time-space-wavelength switching network of the present invention.

Efficient utilization of the time-space switches and flexibility for network expansion can be achieved by adding optical pre-stages of combination splitter-switch configuration and optical post-stages of combination switch-combiner configuration as shown in FIG. 4. In the illustrated embodiment, two pre-stages 80 and 81 and two post-stages 90 and 91 are provided.

Pre-stages 80 comprises splitters 82, 83 and optical switches 84, 85, and pre-stage 81 likewise comprises splitters 86, 87 and optical switches 88, 89. Splitters 82 and 83 are coupled to the respective outputs of splitters 10 and 11 for splitting their incoming optical path into two waveguides leading respectively to optical switches 84 and 85. Similarly, splitters 86 and 87 are coupled to the respective outputs of splitters 10 and 11 for splitting their incoming optical path into two waveguides leading respectively to optical switches 88 and 89. Optical switches 84, 85, 88 and 89 are controlled with a switching signal supplied from network controller 70 to select one of their optical inputs.

Post-stage 90 comprises optical switches 92, 93 and combiners 94, 95 and post-stage 91 likewise comprises optical switches 96, 97 and combiners 98, 99. Optical switches 92 and 93 are coupled to the outputs of wavelength tunable lasers 50 and 51, respectively, for switching their optical input to combiner 94 or 95 in response to a switching signal from controller 70. In like manner, optical switches 96 and 97 are coupled to the outputs of wavelength tunable lasers 52 and 53, respectively. for switching their optical input to combiner 98 or 99 in response to a switching signal from controller 70. The outputs of combiners 94 and 98 are coupled to the respective inputs of combiner 60, and those of combiners 95 and 99 are coupled to the respective inputs of combiner 61.

By operating switch 84 for coupling the output of splitter 82 to wavelength filter 20 and by operating switch 93 for coupling the output of laser 51 to combiner 95, WTDM signals A can be switched to outlet highway 201 in a manner identical to that described above in connection with the first embodiment of this invention. For switching WTDM signals D to outlet highway 201, switch 88 is operated for coupling the output of splitter 86 to wavelength filter 22 and switch 97 is operated for coupling the output of laser 53 to combiner 99.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An optical switching network comprising:
a plurality of optical splitters coupled respectively to inlet highways for receiving a plurality of wavelength-time division multiplex (WTDM) signals through the respective inlet highways, each of the WTDM signals being identified by a unique wavelength onto which a plurality of assigned time slots are multiplexed;
a plurality of sets of tunable wavelength filters, the tunable wavelength filters of each set being coupled to respective outputs of the optical splitters for selecting one of the WTDM signals from the optical splitters;
a plurality of time-space switch means associated respectively with the sets of the tunable wavelength filters, each of the time-space switch means having input ports and output ports, the input ports of each time-space switch means being coupled respectively to outputs of the tunable wavelength filters of the associated set for interchanging the time slot of the selected WTDM signal with another time slot and establishing a path for the timeslot-interchanged WTDM signal between the input ports and the output ports;
a plurality of sets of wavelength conversion means, the wavelength conversion means of each set being coupled to the output ports of an associated one of the time-space switch means for producing an optical output in accordance with the WTDM signal from said established path, said optical output having a wavelength different from the wavelength of the selected WTDM signal; and
a plurality of optical combiners for coupling the output of the wavelength conversion means of different sets to a respective one of outlet highways.

2. An optical switching network as claimed in claim 1, futher comprising a plurality of pre-stages each comprising:
a plurality of second optical splitters coupled respectively to the first-mentioned optical splitters; and
a plurality of optical switches each having a plurality of input ports coupled respectively to the second optical splitters and an output port coupled to an associated one of the tunable wavelength filters, each of the optical switches selectively coupling an output of the second optical splitters to the associated tunable wavelength filter.

3. An optical switching network as claimed in claim 1, further comprising a plurality of post-stages each comprising:
a plurality of optical switches each having an input port coupled to an associated one of the wavelength switch means and a plurality of output ports, each of the optical switches coupling the output of the associated wavelength switch means to one of the output ports thereof; and
a plurality of second optical combiners each having a plurality of input ports coupled respectively to the output ports of the optical switches and an output port coupled to an associated one of the first-mentioned optical combiners.

4. An optical switching network as claimed in claim 2, further comprising a plurality of post-stages each comprising:
a plurality of second optical switches each having an input port coupled to an associated one of the wavelength switch means and a plurality of output ports, each of the second optical switches coupling the output of the associated wavelength switch means to one of the output ports thereof; and
a plurality of second optical combiners each having a plurality of input ports coupled respectively to the output ports of the second optical switches and an output port coupled to an associated one of the first-mentioned optical combiners.

5. An optical switching system comprising:
a plurality of wavelength-time division multiplexers each comprising a plurality of time-division multiplexers for multiplexing incoming signals onto assigned time slots to produce a plurality of time-division multiplex (TDM) signals and a wavelength-division multiplexer coupled to the time-division multiplexers for multiplexing the TDM signals onto different wavelengths to produce wavelength-time division multiplex (WTDM) signals for coupling to inlet highways, respectively;
control means for receiving call processing signals from the wavelength-time division multiplexers for generating control signals;
a like plurality of optical splitters coupled respectively to the inlet highways;
a plurality of sets of tunable wavelength filters, the tunable wavelength filters of each set being coupled to respective output of the optical splitters for selecting the wavelength of one of the WTDM signals in response to a wavelength selection signal from the control means;

a plurality of time-space switch means associated respectively with the sets of said tunable wavelength filters, each of the time-space switch means having input ports and output ports, the input ports of each time-space switch means being coupled respectively to outputs of said tunable wavelength filters of the associated set for interchanging the time slot of the selected wavelength with another time slot and establishing a path for said selected wavelength between said input ports and said output ports in response to a time-space switching signal from the control means;

a plurality of sets of wavelength conversion means, the wavelength conversion means of each set being coupled to the output ports of an associated one of the time-space switch means for producing an optical output in accordance with the WTDM signal from said established path, said optical output having a wavelength determined by a wavelength switching signal from the control means;

a plurality of optical combiners for coupling the output of the wavelength conversion means of different sets to a respective one of outlet highways; and a plurality of wavelength-time division demultiplexers coupled respectively to the outlet highways, each of the wavelength-time division demultiplexers comprising a wavelength-division demultiplexer for demultiplexing the signal on the respective outlet highway into individual wavelengths, and a plurality of time-division demultiplexers respectively demultiplexing the wavelength-demultiplexed signals into individual time slots.

6. An optical switching system as claimed in claim 5, further comprising a plurality of pre-stages, each comprising:

a plurality of second optical splitters coupled respectively to the first-mentioned optical splitters; and a plurality of optical switches each having a plurality of input ports coupled respectively to the second optical splitters and an output port coupled to an associated one of the tunable wavelength filters, each of the optical switches selectively coupling an output of the second optical splitters to the associated tunable wavelength filter in response to a space switching signal from the control means.

7. An optical switching system as claimed in claim 5, further comprising a plurality of post-stages each comprising a plurality of optical switches each having an input port coupled to an associated one of the wavelength conversion means and a plurality of output ports, each of the optical switches coupling the output of the associated wavelength conversion means to one of the output ports thereof in response to a space switching signal from the control means; and a plurality of second optical combiners each having a plurality of input ports coupled respectively to the output ports of the optical switches and an output port coupled to an associated one of the first-mentioned optical combiners.

8. An optical switching system as claimed in claim 6, further comprising a plurality of post-stages each comprising:

a plurality of second optical switches each having an input port coupled to an associated one of the wavelength conversion means and a plurality of output ports, each of the second optical switches coupling the output of the associated wavelength conversion means to one of the output ports thereof in response to a second space switching signal from the control means; and a plurality of second optical combiners each having a plurality of input port coupled respectively to the outputs ports of the second optical switches and an output port coupled to an associated one of the first-mentioned optical combiners.

9. An optical switching network comprising:

a plurality of optical splitters coupled respectively to inlet highways for receiving a plurality of wavelength-time division multiplex (WTDM) signals through the respectively inlet highways, each of the WTDM signals being identified by a unique wavelength onto which a plurality of assigned time slots are multiplexed;

a plurality of sets of tunable wavelength filters, the tunable wavelength filters of each set being coupled to respective outputs of the optical splitters for selecting one of the WTDM signals from the optical splitters;

a plurality of sets of optoelectrical transducers respectively coupled to outputs of said tunable wavelength filters;

a plurality of electrical time-space switch means associated respectively with the sets of the optoelectrical transducers, each of the time-space switch means having input ports and output ports, the input ports of each time-space switch means being coupled respectively to outputs of the optoelectrical transducers of the associated set for interchanging the time slot of the selected WTDM signal with another time slot and establishing a path for the timeslot-interchanged WTDM signal between the input ports and the output ports;

a plurality of sets of wavelength tunable lasers, the wavelength tunable lasers of each set being coupled to the output ports of an associated one of the time-space switch means for generating an optical output in accordance with the WTDM signal from the established path, said optical output having a wavelength different from the wavelength of the selected WTDM signal; and a plurality of optical combiners for coupling the output of the wavelength tunable lasers of different sets to a respective one of outlet highways.

10. An optical switching system comprising:

a plurality of wavelength-time division multiplexers each comprising a plurality of time-division multiplexers for multiplexing incoming signals onto assigned time slots to produce a plurality of time-division multiplex (TDM) signals and a wavelength-division multiplexer coupled to the time-division multiplexers for multiplexing the TDM signals onto different wavelengths to produce wavelength-time division multiplex (WTDM) signals for coupling to inlet highways, respectively;

control means for receiving call processing signals from the wavelength-time division multiplexers for generating control signals;

a plurality of optical splitters coupled respectively to the inlet highways;

a plurality of set of tunable wavelength filters, the tunable wavelength filters of each set being coupled to respective outputs of the optical splitters for selecting the wavelength of one of the WTDM signals in response to a wavelength selection signal from the control means;

a plurality of sets of optoelectrical transducers respectively coupled to outputs of said tunable wavelength filters;

a plurality of time-space switch means associated respectively with the sets of said optoelectrical transducers, each of the time-space switch means having input ports and output ports, the input ports of each time-space switch means being coupled respectively to outputs of said electroptical transducers of the associated set for interchanging the time slot of the selected wavelength with another time slot and establishing a path for said selected wavelength between said input ports and said output ports in response to a time-space switching signal from the control means;

a plurality of sets of wavelength tunable lasers, the wavelength tunable lasers of each set being coupled to the output ports of an associated one of the time-spaced switch means for producing an optical output in accordance with the WTDM signal from said established path, said optical output having a wavelength determined by a wavelength switching signal from the control means;

a plurality of optical combiners for coupling the output of wavelength tunable lasers of different sets to a respective one of outlet highways; and a plurality of wavelength-time division demultiplexers coupled respectively to the outlet highways, each of the wavelength-time division demultiplexers comprising a wavelength-division demultiplexer for demultiplexing the signal on the respective outlet highway into individual wavelengths, and a plurality of time-division demultiplexers respectively demultiplexing the wavelength-demultiplexed signals into individual time slots.

* * * * *